(12) United States Patent
Suhara et al.

(10) Patent No.: US 7,501,209 B2
(45) Date of Patent: Mar. 10, 2009

(54) PROCESS FOR PRODUCING A LITHIUM-COBALT COMPOSITE OXIDE FOR A POSITIVE ELECTRODE FOR A LITHIUM SECONDARY CELL

(75) Inventors: Manabu Suhara, Kanagawa (JP);
Naoshi Saito, Kanagawa (JP);
Kazushige Horichi, Kanagawa (JP);
Megumi Uchida, Kanagawa (JP)

(73) Assignee: Seimi Chemical Co., Ltd., Chigasaki-shi (JP)

( * ) Notice: Subject to any disclaimer, the term of this patent is extended or adjusted under 35 U.S.C. 154(b) by 472 days.

(21) Appl. No.: 10/849,856

(22) Filed: May 21, 2004

(65) Prior Publication Data
US 2004/0213729 A1 Oct. 28, 2004

Related U.S. Application Data

(63) Continuation of application No. PCT/JP03/11259, filed on Sep. 3, 2003.

(30) Foreign Application Priority Data

Sep. 3, 2002 (JP) .................... 2002-258124
Sep. 26, 2002 (JP) .................... 2002-281858
Sep. 26, 2002 (JP) .................... 2002-281870

(51) Int. Cl.
*H01M 4/58* (2006.01)
(52) U.S. Cl. ............ 429/231.95; 429/218.1; 423/594.6
(58) Field of Classification Search .......... 429/218.1, 429/231.8, 231.95, 223, 224, 231.3, 232, 429/231.5, 231.6, 594.6; 423/593.1, 594.5, 423/598, 599, 594.12, 594.9, 463, 594.6
See application file for complete search history.

(56) References Cited

U.S. PATENT DOCUMENTS

| | | | |
|---|---|---|---|
| 7,018,741 B2 * | 3/2006 | Suhara et al. ............ 429/231.1 |
| 2003/0140483 A1 * | 7/2003 | Wakabayashi et al. ..... 29/623.1 |
| 2004/0213729 A1 | 10/2004 | Suhara et al. |
| 2005/0250013 A1 * | 11/2005 | Tatsumi et al. ......... 429/231.95 |

FOREIGN PATENT DOCUMENTS

| | | |
|---|---|---|
| EP | 421421 A1 | 4/1991 |
| JP | 3-201368 | 9/1991 |
| JP | 6-243897 A | 9/1994 |
| JP | 10-1316 A | 1/1998 |
| JP | 10-72219 A | 3/1998 |
| JP | 10-312805 A | 11/1998 |
| JP | 11-292547 A | 10/1999 |
| JP | 2000-82466 A | 3/2000 |
| JP | 2002-060225 * | 2/2002 |
| JP | 2002-60225 A | 2/2002 |
| JP | 2003-109593 | 4/2003 |
| WO | WO 2004/030125 | 4/2004 |
| WO | WO 2004/030126 | 4/2004 |
| WO | WO 2004/051771 | 6/2004 |
| WO | WO 2004/088776 | 10/2004 |

OTHER PUBLICATIONS

U.S. Appl. No. 10/849,846, filed May 21, 2004, Suhara et al.
U.S. Appl. No. 10/743,479, filed Dec. 23, 2003, Suhara et al.
U.S. Appl. No. 10/296,205, filed Nov. 29, 2002, Suhara et al.
U.S. Appl. No. 10/089,109, filed Mar. 26, 2002, Suhara et al.
U.S. Appl. No. 10/916,391, filed Aug. 12, 2004, Suhara et al.
U.S. Appl. No. 10/849,856, filed May 21, 2004, Suhara et al.
U.S. Appl. No. 10/529,289, filed Mar. 25, 2005, Suhara et al.
U.S. Appl. No. 11/136,493, filed May 25, 2005, Horichi et al.
U.S. Appl. No. 12/175,652, filed Jul. 18, 2008, Suhara et al.

* cited by examiner

*Primary Examiner*—Patrick Ryan
*Assistant Examiner*—Monique Wills
(74) *Attorney, Agent, or Firm*—Oblon, Spivak, McClelland, Maier & Neustadt, P.C.

(57) ABSTRACT

The present invention provides a positive electrode, which has a large volume capacity density, high safety, and is excellent in the coating uniformity, the charge and discharge cyclic durability and the low-temperature properties.

Further, the present invention provides a process for producing a lithium-cobalt composite oxide for a positive electrode for a lithium secondary cell, the lithium-cobalt composite oxide being represented by the formula $Li_pCo_xM_yO_zF_a$ (wherein M is a transition metal element other than Co, aluminum or an alkaline earth metal element, $0.9 \leq p \leq 1.1$, $0.980 \leq x \leq 1.000$, $0 \leq y \leq 0.02$, $1.9 \leq z \leq 2.1$, $x+y=1$ and $0 \leq a \leq 0.02$).

13 Claims, No Drawings

PROCESS FOR PRODUCING A LITHIUM-COBALT COMPOSITE OXIDE FOR A POSITIVE ELECTRODE FOR A LITHIUM SECONDARY CELL

BACKGROUND OF THE INVENTION

1. Field of the Invention

The present invention relates to a process for producing a lithium-cobalt composite oxide for a positive electrode for a lithium secondary cell, which has a large volume capacity density and high safety, and is excellent in the charge and discharge cyclic durability and the low-temperature properties, a positive electrode for the lithium secondary cell containing the produced lithium-cobalt composite oxide, and a lithium secondary cell.

2. Discussion of Background

Recently, as the portability and cordless tendency of instruments have progressed, a demand for a non-aqueous electrolytic secondary cell such as a lithium secondary cell which is small in size and light in weight and has a high energy density, has been increasingly high. As a positive electrode active material for the non-aqueous electrolytic secondary cell, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary cell using a lithium-cobalt composite oxide ($LiCoO_2$) as a positive electrode active material and using a lithium alloy or carbon such as graphite or carbon fiber as a negative electrode, can obtain a high voltage at a level of 4V, whereby it has been widely used as a cell having a high energy density.

However, in a case of the non-aqueous type secondary cell using $LiCoO_2$ as a positive electrode active material, further improvement of the capacity density per unit volume of a positive electrode layer and the safety, has been desired. On the other hand, there has been a problem of deterioration of the cyclic property such as gradual reduction of the cell discharge capacity, a problem of the weight capacity density or substantial reduction of the discharge capacity at a low temperature.

In order to solve a part of these problems, it has been proposed in JP-A-6-243897 that the average particle size of $LiCoO_2$ as a positive electrode active material, be from 3 to 9 μm, the volume occupied by a group of particles having a particle size of from 3 to 15 μm, be at least 75% of the total volume, and the intensity ratio of the diffraction peaks at 2θ=about 19° and 45° as measured by means of X-ray diffraction using CuKα as a radiation source, be of a specific value, so that it becomes an active material excellent in the coating properties, the self-discharge properties and the cyclic properties. Further, in the document, it has been proposed that the positive electrode active material is preferably one which does not substantially have such a particle distribution that the particle size of $LiCoO_2$ is less than 1 μm or more than 25 μm. With such a positive electrode active material, the coating properties and the cyclic properties have been improved, but, the safety, the volume capacity density and the weight capacity density, have not yet been fully satisfactory.

Further, in order to improve the weight capacity density and the charge and discharge cyclic properties of the positive electrode, JP-A-2000-82466 proposes a positive electrode active material wherein the average particle size of lithium composite oxide particles is from 0.1 to 50 μm, and at least two peaks are present in the particle size distribution. Further, it has been proposed to mix two types of positive electrode active materials having different average particle sizes to prepare a positive electrode active material wherein at least two peaks are present in the particle size distribution. In such a proposal, there may be a case where the weight capacity density and the charge and discharge cyclic properties of the positive electrode can be improved, but on the other hand, there is a complication that the positive electrode material powders having two types of particle size distributions have to be produced, and one satisfying all of the volume capacity density, the safety, the coating uniformity, the weight capacity density and the cyclic properties of the positive electrode, has not yet been obtained.

Further, in order to solve the problem related to the cell characteristics, JP-A-3-201368 proposes to replace 5 to 35% of Co atoms with W, Mn, Ta, Ti or Nb to improve the cyclic properties. Further, JP-A-10-312805 proposes to use hexagonal $LiCoO_2$ as a positive electrode active material to improve the cyclic properties, wherein the c axis length of the lattice constant is at most 14.051 Å, and the crystal lattice size of (110) direction of the crystal lattice is from 45 to 100 nm.

Further, JP-A-10-72219 proposes that a lithium composite oxide of the formula $Li_xNi_{1-y}N_yO_2$ (wherein $0<x<1.1$, $0 \leq y \leq 1$), of which the primary particles are plate-like or columnar, the ratio of (volume standard cumulative 95% size—volume standard cumulative 5% size)/(volume standard cumulative 5% size) is at most 3, and further, the average particle size is from 1 to 50 μm, has a high initial discharge capacity per weight and further is excellent in the charge and discharge cyclic durability.

Further, JP-A-2002-60225 proposes to lithiate a cobalt compound powder in the form of secondary particles with an average particle size of 0.5 to 30 μm formed by agglomeration of primary particles of cobalt hydroxide, cobalt oxyhydroxide or cobalt oxide with an average particle size of from 0.01 to 2 μm. However, also in this case, it is not possible to obtain a positive electrode material having a high volume capacity density, and further, the material is insufficient also with respect to the cyclic properties, the safety or the large current discharge properties.

As described above, in the prior art, there has been no lithium secondary cell using a lithium composite oxide as a positive electrode active material, which sufficiently satisfies all of the volume capacity density, the safety, the coating uniformity, the cyclic properties and further the low temperature properties.

SUMMARY OF THE INVENTION

It is an object of the present invention to provide a process for producing a lithium-cobalt composite oxide for a positive electrode for a lithium secondary cell, which has a large volume capacity density and high safety, and is excellent in the charge and discharge cyclic durability and the low-temperature properties, a positive electrode for the lithium secondary cell containing the produced lithium-cobalt composite oxide, and a lithium secondary cell.

The present inventors have continued an extensive study, and as a result, have found that this object can be achieved by using cobalt hydroxide having low crystallinity, a relatively high specific surface area, a low press density and specific physical properties in the form of secondary particles formed by dense agglomeration of primary particles (referred to also as the first cobalt hydroxide against the second cobalt hydroxide which will be described hereinafter), or a mixture comprising the above cobalt hydroxide and the second cobalt hydroxide, tricobalt tetroxide or cobalt oxyhydroxide in a specific ratio, as a cobalt source which is a starting material of lithium-cobalt composite oxide, and by firing a mixture of the cobalt source and a lithium source at a specific temperature.

Namely, the present invention is essentially directed to the following.

(1) A process for producing a lithium-cobalt composite oxide for a positive electrode for a lithium secondary cell, the lithium-cobalt composite oxide being represented by the formula $Li_pCo_xM_yO_zF_a$ (wherein M is a transition metal element other than Co, aluminum or an alkaline earth metal element, $0.9 \leq p \leq 1.1$, $0.980 \leq x \leq 1.000$, $0 \leq y \leq 0.02$, $1.9 \leq z \leq 2.1$, $x+y=1$ and $0 \leq a \leq 0.02$), which comprises firing a mixture of a cobalt source, a lithium source, and if required, the following M element source and a fluorine source at a temperature of from 800° C. to 1050° C. in an oxygen-containing atmosphere, characterized in that as the above cobalt source, cobalt hydroxide is used which has a specific surface area of from 5 to 50 m²/g, a press density of from 1.0 to 2.5 g/cm³ and a structure having secondary particles formed by agglomeration of primary particles, and further that the average particle size D50 after the secondary particles are dispersed in pure water, is at most ¼ of the original average particle size.

(2) The process according to (1), wherein as a cobalt source, a mixture is used which comprises the above cobalt hydroxide (a first cobalt hydroxide) and a second cobalt hydroxide, tricobalt tetroxide or cobalt oxyhydroxide, of which secondary particles formed by agglomeration of primary particles have a substantially spherical shape with an average particle size of from 7 to 20 µm, in an atomic ratio of from 5:1 to 1:5.

(3) The process according to (1) or (2), wherein as measured by means of X-ray diffraction in which CuKα is used as a radiation source, of the first cobalt hydroxide, the half value width of a diffraction peak on (001) surface at $2\theta=19\pm1°$ is from 0.18 to 0.35°, and the half value width of a diffraction peak on (101) surface at $2\theta=38\pm1°$ is from 0.15 to 0.35°.

(4) The process according to any one of (1) to (3), wherein the average particle size D50 of secondary particles of the first cobalt hydroxide, is from 5 to 25 µm.

(5) The process according to any one of (1) to (4), wherein the average particle size D50 of primary particles of the first cobalt hydroxide, is from 0.1 to 1.2 µm.

(6) The process according to any one of (2) to (5), wherein the second cobalt hydroxide, tricobalt tetroxide or cobalt oxyhydroxide, has a specific surface area of at least 2 m²/g, and a tap density of from 1.7 to 2.4 g/cm³.

(7) The process according to any one of (2) to (6), wherein the second cobalt hydroxide, tricobalt tetroxide or cobalt oxyhydroxide, has D10 which is at least 50% of D50, and D90 which is at most 150% of D50.

(8) The process according to (2), wherein of cobalt oxyhydroxide, the half value width of the diffraction peak on the (220) surface at $2\theta=31\pm1°$ is at least 0.8°, and the half value width of the diffraction peak on the (311) surface at $2\theta=37\pm1°$ is at least 0.8°, and the specific surface area is from 10 to 80 m²/g.

(9) The process according to any one of (1) to (8), wherein the lithium-cobalt composite oxide has a press density of from 3.15 to 3.40 g/cm³.

(10) The process according to any one of (1) to (9), wherein M is at least one member selected from the group consisting from Ti, Zr, Hf, V, Nb, Ta, Mn, Mg, Ca, Sr, Ba and Al.

(11) The process according to any one of (1) to (10), wherein of the lithium-cobalt composite oxide, the half value of width of the diffraction peak on the (110) surface is from 0.07 to 0.14°, the specific surface area is from 0.3 to 0.7 m²/g, and the heat generation starting temperature is at least 160° C.

(12) The process according to any one of (1) to (11), wherein the remaining alkali amount contained in the lithium-cobalt composite oxide is at most 0.03 mass %.

(13) A positive electrode for a lithium secondary cell, which contains a lithium-cobalt composite oxide produced by the process as defined in any one of (1) to (11).

(14) A lithium secondary cell, wherein the positive electrode as defined in (13) is used.

It is not necessarily clearly understood why the above objects can be achieved by adopting such a constitution in the present invention, but it is considered that in a case where the crystallinity of cobalt hydroxide is high, the specific surface area is small, and the press density is high, the reaction rate of the lithiation of cobalt hydroxide may be slow, and accordingly the growth of primary particles of the obtainable lithium-cobalt composite oxide may be slow, whereby a lithium-cobalt composite oxide composed of a dense secondary particles tends to be hardly formed, and the packing properties of the entire powder forming the positive electrode active material, will not be high.

On the contrary, in a case where the crystallinity of cobalt hydroxide is low, the specific surface area is large, and the press density is low, it is considered that the reaction of the lithiation of cobalt hydroxide progresses at a low temperature, and the growth of primary particles will be accelerated, whereby the density of the secondary particles will be increased, and further, cohesion of the secondary particles after the lithiation is weak, whereby the packing properties during pressing of the entire powder to form a positive electrode active material, will increase, and, as a result, the above effects can be obtained.

DETAILED DESCRIPTION OF THE PREFERRED EMBODIMENTS

A lithium-cobalt composite oxide for a positive electrode for a lithium secondary cell to be produced in the present invention is represented by the formula $Li_pCo_xM_yO_zF_a$. In such a formula, M, p, x, z and a are as defined above. Among them, p, x, y, z and a are preferably as follows: $0.97 \leq p \leq 1.03$, $0.990 \leq x \leq 1.0$, $0.0005 \leq y \leq 0.01$, $1.95 \leq z \leq 2.05$, $x+y=1$ and $0.001 \leq a \leq 0.01$. Here, when a is larger than 0, it is a composite oxide having some of its oxygen atoms substituted by fluorine atoms. In such a case, the safety of the obtained positive electrode will be improved.

Further, M is a transition metal element other than Co, aluminum or an alkaline earth metal. The transition metal element represents a transition metal of Group 4, Group 5, Group 6, Group 7, Group 8, Group 9, Group 10 or Group 11 of the Periodic Table. Among them, M is preferably at least one element selected from the group consisting of Ti, Zr, Hf, V, Nb, Ta, Mn, Mg, Ca, Sr, Ba and Al. Among them, Ti, Zr, Hf, Mg or Al is particularly preferred from the viewpoint of the volume development properties, the safety, the cyclic durability, etc.

In the present invention, in a case where the above M element and/or F is contained, each of the M element and F is preferably present on the surface of the lithium cobalt oxide. By the presence of these elements on the surface of the lithium cobalt oxide particles, the important cell characteristics, such as the safety or the charge and discharge cyclic properties can be improved by an addition of a small amount without bringing about the reduction of the cell performance. The presence of these elements on the surface can be judged by carrying out a spectroscopic analysis such as a XPS analysis.

The lithium-cobalt composite oxide of the present invention can be obtained by firing a mixture of cobalt hydroxide, a lithium source, and, if required, an M element source and a fluorine source, in an oxygen-containing atmosphere. In this case, as the cobalt hydroxide (the first cobalt hydroxide), cobalt hydroxide having a specific surface area of from 5 to 50 m$^2$/g and a press density of from 1.0 to 2.5 g/cm$^3$ is used, wherein as measured by means of X-ray diffraction in which CuKα is used as a radiation source, the half value width of a diffraction peak on (001) surface at 2θ=19±1° is from 0.18 to 0.35°, and the half value width of a diffraction peak on (101) surface at 2θ=38±1° is from 0.15 to 0.35°, and further, it is necessary to fire the above mixture at a temperature of from 800° C. to 1050° C.

As measured by means of X-ray diffraction in which CuKα is used as a radiation source, if the half value width of a diffraction peak on (001) surface at 2θ=19±1° and the half value width of a diffraction peak on (101) surface at 2θ=38±1°, of the first cobalt hydroxide to be used, are out of the above ranges defined by the present invention, the powder will be bulky, the press density of the positive electrode will decrease, and the safety will deteriorate, and thus, the object of the present invention can not be accomplished. Among the above half value widths, the half value width of a diffraction peak on (001) surface at 2θ=19±1° is preferably from 0.22 to 0.30° and the half value width of a diffraction peak on (101) surface at 2θ=38±1° is preferably from 0.18 to 0.30°.

Further, if the specific surface area of the first cobalt hydroxide is smaller than 5 m$^2$/g, the press density of the positive electrode will decrease, and the safety will deteriorate. On the contrary, if it exceeds 50 m$^2$/g, the powder will be bulky. Particularly, the specific surface area is preferably from 10 to 30 m$^2$/g. Further, if the press density of the first cobalt hydroxide is smaller than 1.0 g/cm$^3$, the powder will be bulky. On the other hand, if it exceeds 2.5 g/cm$^3$, the press density will decrease, such being undesirable. Among them, the press density is preferably from 1.3 to 2.2 g/cm$^3$. Further, unless otherwise specified in the description including Examples, the press density of the present invention refers to the apparent press density after the particle powder is subjected to the press compression under a pressure of 0.3 t/cm$^2$.

Further, it has been found that a lithium-cobalt composite oxide having excellent properties as a positive electrode active material, can be obtained when the cohesion among the secondary particles of the first cobalt hydroxide is small. The cohesion among the secondary particles is defined as the ratio of the average particle size D50 after the secondary particles of cobalt hydroxide are dispersed in pure water, to the original average particle size D50. Dispersion of the above particles in pure water is carried out under irradiation with ultrasonic wave (42 KHz, 40W) for 3 minutes. If the cohesion among the secondary particles is large, the average particle size after the secondary particles are dispersed as above, will be the same as the original average particle size, but, if the cohesion is small, it will be small. In the present invention, the average particle size after dispersed as above is preferably at most ¼, particularly preferably at most ⅛, of the original average particle size.

Further, the first cobalt hydroxide preferably has an average particle size D50 of the primary particles of from 0.1 to 1.2 μm. If the average particle size of the primary particles is out of the range, the powder will be bulky, the safety of the positive electrode will deteriorate, or the press density of the positive electrode will decrease, such being undesirable. Especially, the average particle size D50 of the primary particles is preferably from 0.3 to 1.0 μm.

The average particle size D50 of the secondary particles of the first cobalt hydroxide formed from the above primary particles is preferably from 5 to 25 μm. If the average particle size of the secondary particles is out of the range, the press density of the positive electrode, the large current discharge properties, and the self-discharge properties will decrease. Especially, the average particle size D50 of the secondary particles is preferably from 8 to 20 μm.

Further, the shape of the secondary particles of the first cobalt hydroxide is preferably substantially spherical. The shape of the particle being substantially spherical includes a spherical shape, a rugby ball shape, a polygonal shape, etc. The major axis/minor axis is preferably from 2/1 to 1/1, particularly preferably from 1.5/1 to 1/1. Especially, it preferably has a shape as spherical as possible.

In the present invention, as the cobalt source, in addition to the first cobalt hydroxide, it is preferred to use a mixture comprising the second cobalt hydroxide, tricobalt tetroxide or cobalt oxyhydroxide, of which the secondary particles formed by agglomeration of the primary particles have a substantially spherical shape with an average particle size of from 7 to 20 μm. By mixing the second cobalt hydroxide, tricobalt tetroxide or cobalt oxyhydroxide, the tap density of the prepared powder before the mixture of the cobalt source and the lithium source is subjected to firing, increases as compared with the case where the first cobalt hydroxide is used alone as the cobalt source, whereby the productivity of the lithium cobalt oxide increases, such being desirable.

Here, as the second cobalt hydroxide, tricobalt tetroxide or cobalt oxyhydroxide, the primary particles are different from those of the first cobalt hydroxide, and it is required to use one, of which the firmly agglomerated secondary particles have a substantially spherical shape with an average particle size of from 7 to 20 μm, preferably from 10 to 15 μm. If the average particle size of the second cobalt hydroxide is smaller than 7 μm, the press density of the positive electrode will decrease. On the other hand, if it exceeds 20 μm, the large current discharge properties will decrease. The shape of the particles is preferably substantially spherical. The shape of the particles being substantially spherical includes a spherical shape, a rugby ball shape, a polygonal shape, etc. The major axis/minor axis is preferably from 2/1 to 1/1, particularly preferably from 1.5/1 to 1/1. Especially, it preferably has a shape as spherical as possible.

Further, the second cobalt hydroxide, tricobalt tetroxide or cobalt oxyhydroxide preferably has a narrow particle size distribution. In such a case, an unexpectedly high press density of the produced cobalt-lithium composite oxide is obtainable. In the case where the particle size distribution is narrow, if a pressure is applied from outside, the secondary particles of the first cobalt hydroxide will be broken down, and they will be packed among the second cobalt hydroxide, tricobalt tetroxide or cobalt oxyhydroxide composed of secondary particles having primary particles firmly agglomerated. Further, when the pressure is applied to the second cobalt hydroxide, tricobalt tetroxide or cobalt oxyhydroxide, it will be easily packed by itself to a high degree, whereby the large packing rate will be obtained. Accordingly, as the second cobalt hydroxide, tricobalt tetroxide or cobalt oxyhydroxide, the average particle size D10 is preferably at least 50%, particularly preferably at least 65%, of the average particle size D50, and the average particle size D90 is preferably at most 150%, particularly preferably at most 135%, of the average particle size D50.

Further, the second cobalt hydroxide or tricobalt tetroxide preferably has a specific surface area of at least 2 m$^2$/g, and preferably has a tap density of from 1.7 to 2.4 g/cm$^3$. If their specific surface areas are smaller than 2 m²/g, the safety will deteriorate. Especially, the specific surface areas are preferably from 3 to 10 m²/g. If the tap density is smaller than 1.7 g/cm³, the tap density of the positive electrode will decrease. On the contrary, if the tap density is larger than 2.4 g/cm³, the large current discharge properties will decrease. Especially, the tap density is preferably from 1.9 to 2.3 g/cm³. In the present invention, the tap density is calculated in accordance with the heavy bulk density as defined in JISR9301-1-2-3.

Further, the cobalt oxyhydroxide is especially preferably such that in the X-ray diffraction spectrum using Cu-Kα ray, the half value width of on (220) surface at 2θ=31±1° is preferably at least 0.8°, particularly preferably at least 1.0°, and the half value width of a diffraction peak on (311) surface at 2θ=37±1° is preferably at least 0.8°, particularly preferably at least 1.1°. If the half value width is out of the above range, the powder will be bulky during lithiation, the discharge rate property decreases, and the safety deteriorates, whereby the object of the present invention will not be achieved. Further, the specific surface area is preferably from 10 to 80 m²/g, particularly preferably from 30 to 50 m²/g.

In the present invention, the mixture of the first cobalt hydroxide, and the second cobalt hydroxide, tricobalt tetroxide or cobalt oxyhydroxide, is used as a cobalt source. In this case, the ratio of the former/the latter is from 5/1 to 1/5 in a cobalt atomic ratio. If the ratio is larger than 5/1, the tap density of the blended powder of starting materials will decrease, and the productivity in the production of the powder for the positive electrode decreases. On the other hand, if it is smaller than 1/5, the improving effect of the press density of the positive electrode decreases, whereby the object of the present invention will not be achieved. Especially, the ratio is preferably from 3/1 to 1/3, particularly preferably from 2/1 to 1/2.

Further, in the present invention, when a mixture of the cobalt source, a lithium source, and if required, an M element source and a fluorine source, is fired in an oxygen-containing atmosphere, the temperature is from 800 to 1050° C. If the firing temperature is lower than 800° C., the lithiation will be incomplete. On the other hand, if the temperature exceeds 1050° C., the charge and discharge cyclic durability or the initial capacity will decrease. Especially, the firing temperature is preferably from 900 to 1000° C. In the present invention, there is an advantage that a complicated lithiation method such as a spray drying of a slurry is not used. Further, if the method as disclosed in JP-A-2002-60225, is used, that is, if a slurry in water system is used, the agglomerates of secondary particles will be broken down, such being undesirable. The present invention is characterized in that secondary particles of the first cobalt hydroxide having an weak cohesion are blended in a dry system, and then fired.

The cobalt hydroxide having the above specific physical properties to be used for producing the lithium cobalt composite oxide of the present invention, may be produced by various methods, and the production process is not limited. For example, by continuously mixing a mixture of any aqueous cobalt salt solution of an aqueous cobalt sulfate solution, an aqueous cobalt chloride solution or an aqueous cobalt nitrate solution, and aluminum hydroxide, with an aqueous sodium hydroxide solution, a slurry containing cobalt hydroxide can easily be produced. And, at that time, by changing reaction conditions such as the pH or stirring, the first cobalt hydroxide having the physical properties of the present invention can be obtained.

The present invention is characterized by mixing and firing the cobalt source and the lithium source, having the above specific structures. However, if a part of the cobalt hydroxide is further substituted by another cobalt source, there will be a case where the balance such as the cell characteristics or productivity for producing the positive electrode can further be improved. However, in order to obtain the effect according to the present invention as described above, it is preferred to incorporate at least 10 mol % of the first cobalt hydroxide having the specific structure of the present invention to the total cobalt sources. If the amount is less than 10 mol %, the effect of the present invention will decrease, such being undesirable. Especially, the amount is preferably at least 30%.

As the lithium source used together with the above cobalt source, lithium carbonate or lithium hydroxide is preferably used. Further, as the starting material for the element M to be used as the case requires, a hydroxide, an oxide, a carbonate or a fluoride is preferably selected. As the fluorine source, a metal fluoride, LiF, $MgF_2$ or the like, is selected. The mixed powder of cobalt hydroxide, the lithium source, the starting material for the element M and the fluorine source, is subjected to firing for 5 to 20 hours in an oxygen-containing atmosphere at a temperature of from 800 to 1050° C., as mentioned above, and the obtained fired-product is cooled, then pulverized and classified to obtain particles of the lithium-cobalt composite oxide.

The lithium-cobalt composite oxide produced in this manner, preferably has an average particle size D50 of from 5 to 15 μm, particularly preferably from 8 to 12 μm, and preferably has a specific surface area of from 0.3 to 0.7 m²/g, particularly preferably from 0.4 to 0.6 m²/g. Further, as measured by means of X-ray diffraction in which CuKα is used as a radiation source, the half value width of a diffraction peak on (110) surface at 2θ=66.5±1° is preferably from 0.07 to 0.14°, particularly preferably from 0.08 to 0.12°, and the press density is preferably from 3.15 to 3.40 g/cm³, particularly preferably from 3.20 to 3.35 g/cm³. Further, the lithium-cobalt composite oxide of the present invention has a remaining alkali amount contained therein, of preferably at most 0.03 mass %, particularly preferably at most 0.01 mass %.

In a case where a positive electrode for a lithium secondary cell is produced from the lithium-cobalt composite oxide, it is produced by mixing a carbon type conductive material such as acetylene black, graphite or Ketjenblack and a binding material to the powder of such a composite oxide. As the above binding material, polyvinylidene fluoride, polytetrafluoroethylene, polyamide, carboxymethyl cellulose or acrylic resin is preferably used.

The powder of the lithium-cobalt composite oxide of the present invention, a conductive material and a binding material are formed into a slurry or a kneaded product by using a solvent or a dispersion medium. This is supported on a positive electrode current collector such as an aluminum foil or a stainless steel foil, by e.g. coating, to obtain a positive electrode for the lithium secondary cell.

In the lithium secondary cell using the lithium-cobalt composite oxide of the present invention as the positive electrode active material, as a separator, e.g. a film of porous polyethylene or porous polypropylene is used. Further, as a solvent of an electrolytic solution of the cell, various types of solvents can be used, and among them, an ester carbonate is preferable. As the ester carbonate, each of circular type and a chain type can be used. As a cyclic type ester carbonate, propylene carbonate or ethylene carbonate (EC) may, for example, be mentioned. As a chain ester carbonate, dimethyl carbonate or diethyl carbonate (DEC), ethylmethyl carbonate (EMC), methylpropyl carbonate or methyl isopropyl carbonate may, for example, be mentioned.

In the present invention, the above ester carbonate can be used alone or by mixing at least two types. Further, it may be used by mixing with another solvent. Further, according to the material of the negative electrode active material, if the chain type ester carbonate is used together with the cyclic type ester carbonate, there is a case where the discharge property, the cyclic durability or the charge and discharge efficiency can be included.

Further, in the lithium secondary cell using the lithium-cobalt composite oxide of the present invention as a positive electrode active material, a gel polymer electrolyte including vinylidene fluoride-hexafluoropropylene copolymer (for example, manufactured by Elf Atochem, brand name: Kynar) or vinylidene fluoride-perfluoropropylvinyl ether copolymer may be mentioned. As the above electrolytic solvent or the solute added to the polymer electrolyte, at least any one member of lithiate is preferably used, wherein e.g. $ClO_4$—, $CF_3SO_3$—, $BF_4$—, $PF_6$—, $AsF_6$—, $SbF_6$—, $CF_3CO_2$—, $(CF_3SO_2)_2N$— is anion. It is preferably added at a concentration of 0.2 to 2.0 mol/l (liter) to the electrolytic solvent or polymer electrolyte comprising of the above lithiate. If it departs from this range, ionic conductivity will decrease, and the electrical conductivity of the electrolyte will decrease. Among them, it is particularly preferably from 0.5 to 1.5 mol/l.

In the lithium cell using the lithium cobalt composite oxide in the present invention as a positive electrode active material, the material which can occlude and discharge, can be used as a negative electrode active material. The material forming this negative electrode active material is not particularly limited. However, oxide which is considered as a main body such as a lithium metal, lithium alloy, a carbon material, a metal of Group 14 or Group 15 of the Periodic Table, a carbon compound, a silicon carbide, a silicon oxide compound, a titanium sulfide or boron carbide may, for example, be mentioned. As the carbon material, an organic material which is subject to thermal decomposition in the condition of various thermal decompositions, artificial carbon, natural carbon, soil carbon, expanded carbon or squamation carbon etc. can be used. Further, as the oxide, a compound comprising in oxide as a main body can be used. As the negative electrode collector, a copper foil, a nickel foil etc. can be used. The above active material is kneaded with an organic solvent to be slurry, followed by coating on the metal foil collector, and then dried and pressed, whereby the negative electrode can preferably be produced.

The shape of the lithium cell using the lithium-cobalt composite oxide of the present invention as a positive electrode active material, is not particularly restricted. Sheet, film, folding, winding type cylinder with bottom or button shape etc. is selected according to use.

Now, the preset invention will be described in detail with reference to Examples. However, it should be understood that the present invention is by no means restricted to such specific Examples.

EXAMPLE 1

A mixed solution of a cobalt sulfate aqueous solution and an ammonium hydroxide and a caustic soda aqueous solution is continuously mixed, whereby a cobalt hydroxide slurry is continuously prepared by means of the known method, followed by steps of agglomeration, filtration and drying to obtain a cobalt hydroxide powder. As measured by means of X-ray diffraction in which CuKα is used as a radiation source, of the obtained cobalt hydroxide (the first cobalt hydroxide), the half value width of a diffraction peak on (001) surface at $2\theta=19\pm1°$ is 0.27°, and the half value width of a diffraction peak on (101) surface at $2\theta=38\pm1°$ is 0.23°. As a result of observation by scanning electron microscope, it has been found that the particles are agglomerated, and formed from the secondary particles with the substantially spherical shape. As a result of size distribution analysis of volume standard calculated from image analysis of observation by scanning electron microscope, the average particle size D50 was 17.5 μm, D10 was 7.1 μm and D90 was 26.4 μm.

The specific surface area of the cobalt hydroxide particle comprising the secondary particle was 17.1 m²/g, the press density was 1.75 g/cm³, and it was a cobalt hydroxide powder having the substantially spherical shape comprising agglomerating the primary particles. The ratio of major axis:minor axis was 1.2:1. In order to judge cohesion of the obtained the secondary particles of the cobalt hydroxide, it was dispersed in the pure water, as a result the secondary particles are easily broken down. The size distribution of this powder was measured after an ultrasonic wave (42 KHz, 40W) was irradiated thereto for 3 minutes by using a laser diffusion type particle size distribution measuring apparatus, wherein the pure water is used as a dispersion medium. As a result, the average particle size D50 was 0.75 μm, D10 was 0.35 μm and D90 was 1.6 μm. The average particle size D50 (0.75 μm) was about 1/23 of D50 of the original particles (17.5 μm). The slurry after completion of measurement was dried, followed by observation by scanning electron microscope, the shape of the secondary particle before measurement was not identified.

Cobalt hydroxide comprising the above aggregate and a lithium carbonate powder with the specific surface area of 1.2 m²/g was mixed. The blended ratio of cobalt hydroxide and cobalt carbonate was prepared so as to be the same manner of $LiCoO_2$ after firing. The tap density of the prepared powder was 0.78 g/cm³, wherein these two types of powders were dry blended. By using this prepared powder, firing was carried out for 12 hours at 950° C. in the air. The size distribution of $LiCoO_2$ powder, wherein the primary particles obtained by using the fired product as agglomerated, was measured in an aqueous solution by using the laser diffusion type particle size distribution measuring apparatus, as a result the average particle size D50 was 12.9 μm, D10 was 4.3 μm and D90 was 23.5 μm, and powder $LiCoO_2$ with the substantially spherical shape having the specific surface area determined by means of BET method of 0.58 m²/g. As this powder $LiCoO_2$, X-ray diffraction spectrum was obtained by using X-ray diffraction device (RINT 2100 model manufactured by Rigaku Industrial Corporation). As measured by means of X-ray diffraction in which CuKα is used, the half value width of a diffraction peak on (110) surface at $2\theta=66.5\pm1°$ was 0.101°. The press density of the powder $LiCoO_2$ was 3.21 g/cm³. Further, the press density under a pressure of 0.97 t/cm² was 3.49 g/cm³. 10 g of this powder $LiCoO_2$ was dispersed in 100 g of pure water and filtrated, and the remaining alkali amount as calculated by means of potentiometric titration at 0.1 NHCl, as a result it was 0.02 mass %.

The above $LiCoO_2$ powder, acetylene black and a polyvinylidene fluoride powder are mixed at a mass ratio of 90/5/5, a slurry was prepared by adding N-methyl pyrrolidone, and single coating as carried out by sing a Doctor Blade as 20 μm thickness of an aluminum foil. After drying, roll press rolling was carried out five times, whereby a positive electrode body sheet for the lithium cell was prepared.

Then, one punched out the above positive electrode body sheet was used as the positive electrode, a metal lithium foil with a thickness of 500 μm was used as a negative electrode, 20 μm of a nickel foil was used as the negative electrode collector, and porous propylene with a thickness of 25 μm was used as a separator. Further, as a electrolytic solution, a solution is 1M concentration of $LiPF_6$/EC+DEC (1:1) (It means a mixed solution at a mass ratio (1:1) of EC and DEC of which the solute is $LiPF_6$. Hereinafter the solute may be referred to as this as well). A pair of a simplifying sealed cell type lithium cell made of stainless steel as assembled in an argon glove box.

The above piece of the cell was charged up to 4.3V at a load current of 75 mA per 1 g of a positive electrode active material at 25° C., and discharged down to 2.5V at a load current of 75 mA per 1 g of a positive electrode active material, whereby initial discharge capacity as calculated. Further, the density of a positive electrode layer was calculated. Further, with this cell, the charge and discharge cyclic test was continuously carried out 30 times. As a result, an initial volume capacity density of the positive electrode layer at a voltage of from 2.5 to 4.3V, and at a temperature of 25° C., was 460 mAh/cm$^3$. An initial weight capacity density was 163 mAh/g-$LiCoO_2$, a capacity maintenance ratio after 30 times of charge and discharge cycle, was 98.3%.

Further, the other cell was charged for 10 hours at 4.3V, and then broken down in the argon glove box. The positive electrode body sheet was picked up after charge, followed by washing, and then punched out at a radius of 3 mm, and then sealed in an aluminum capsule with EC. And then, it was heated up at a speed of 5° C./minute by using a scanning differential calorimeter, whereby a heat generation starting temperature was measured. As a result, the exothermic starting temperature of charging product with 4.3V was 166° C.

EXAMPLE 2

A positive electrode active material was prepared in the same manner as in Example 1 except that in Example 1, when cobalt hydroxide and lithium carbonate were mixed, a titanium oxide powder and a lithium fluoride powder were added. The size distribution of the $LiCoO_2$ powder comprising agglomerating the primary particles obtained by using the fired product, was measured by using a laser diffusion type particle size distribution measuring apparatus. As a result, the average particle size D50 was 12.3 μm, D10 was 4.1 μm and D90 was 22.5 μm, and the powder with sufficiently spherical shape having the specific surface area determined by means of BET method 0.61 m$^2$/g was obtained. As a result of an elemental analysis of this powder, it was $LiCo_{0.997}Ti_{0.003}O_{1.995}F_{0.005}$. As a result of research by means of a spectroscopic analysis, titanium and fluorine are localized on the surface. As the $LiCo_{0.997}Ti_{0.003}O_{1.995}F_{0.005}$ powder, the X-ray diffraction spectrum was obtained by using the X-ray diffraction device (RINT 2100 model manufactured by Rigaku Industrial Corporation). In an powder X-ray diffraction using CuKα-ray, the half value width of a diffraction peak on (110) surface at 2θ=66.5±1° was 0.115°. The press density of the above powder was 3.23 g/cm$^3$. Further, the press density under a pressure of 0.97 t/cm$^2$ was 3.51 g/cm$^3$. Further, 10 g of the above powder was dispersed in 100 g of pure water and filtrated, and then the remaining alkali amount was calculated by means of potentiometric titration at 0.1 NHCl, as a result it was 0.02 mass %.

By using the above $LiCo_{0.997}Ti_{0.003}O_{1.995}F_{0.005}$ powder, the positive electrode body was produced, the cell was assembled, and the properties were measured in the same manner as in Example 1. The initial volume capacity density of the positive electrode layer was 460 mAh/cm$^3$, the initial weight capacity density was 162 mAh/g-$LiCoO_2$, and the capacity maintenance ratio after 30 times of charge and discharge cycle was 99.5%. The heat generation starting temperature of the charged product with a voltage of 4.3V was 176° C.

EXAMPLE 3

Comparative Example $LiCoO_2$ was prepared in the same manner as in Example 1 except that a commercial aggregated cobalt hydroxide was used. As a result of researching the physical properties of cobalt hydroxide, in a powder X-ray diffraction using CuKα-ray, the half value width of a diffraction peak on (001) surface at 2θ=about 19° was 0.16°, and the half value width of a diffraction peak on (101) surface at 2θ=about 38° was 0.15°. The particle size distribution was measured by ultrasonic dispersion in pure water by means of a laser scattering type particle size distribution measuring apparatus in the same manner as in Example 1. As a result, the average particle size D50 was 3.5 μm, D10 was 0.3 μm and D90 was 7.6 μm. Further, in the particle size distribution analysis by volume basis obtained from an image analysis of the observation by the scanning electron microscope, the same particle size distribution was obtained. Further, the specific surface area of this aggregated cobalt hydroxide was 2.4 m$^2$/g, the press density was 2.21 g/cm$^3$, and it was an aggregated cobalt hydroxide powder.

A $LiCoO_2$ powder was prepared in the same manner as in Example 1 except that this cobalt hydroxide powder was used. The average particle size D50 was 2.6 μm, D10 was 1.5 μm, and D90 was 5.6 μm, and an aggregated $LiCoO_2$ powder having a specific surface area of 0.55 m$^2$/g as determined by a BET method, was obtained. With respect to the $LiCoO_2$ powder, the X-ray diffraction spectrum was obtained by means of an X-ray diffraction device (RINT 2100 model manufactured by Rigaku Industrial Corporation). In the powder X-ray diffraction using CuKα-ray, the half value width of a diffraction peak on (110) surface at 2θ=66.5±1° was 0.099°. The press density of the obtained $LiCoO_2$ powder was 2.79 g/cm$^3$. Further, the press density under a pressure of 0.97 t/cm$^2$ was 3.02 g/cm$^3$.

In the same manner as in Example 1, a positive electrode body was produced, a cell was assembled, and the properties were measured. The initial volume capacity density of the positive electrode layer was 392 mAh/cm$^3$, the initial weight capacity density was 160 mAh/g-$LiCoO_2$, and the capacity maintenance ratio after 30 times of the charge and discharge cycle was 96.6%. The heat generation starting temperature of the product charged with 4.3V was 157° C.

EXAMPLE 4

A positive electrode active material was prepared in the same manner as in Example 2 except that in Example 2, aluminum hydroxide was used instead of titanium oxide. As a result of a chemical analysis, it was found to be $LiCo_{0.997}Al_{0.003}O_{1.995}F_{0.0005}$, and the press density of this powder was 3.24 g/cm$^3$. Further, the press density under a pressure of 0.97 t/cm$^2$ was 3.50 g/cm$^3$.

Further, a positive electrode body was produced, a cell was assembled, and the properties were measured in the same manner as in Example 1. The initial volume capacity density of the positive electrode layer was 457 mAh/cm$^3$, the initial weight capacity density was 161 mAh/g, the capacity maintenance ratio after 30 times of cycle was 99.4%, and the heat generation starting temperature was 177° C.

EXAMPLE 5

A positive electrode active material was prepared in the same manner as in Example 2 except that in Example 2, magnesium hydroxide was used instead of titanium oxide. As a result of a chemical analysis, it was found to be $LiCo_{0.997}Mg_{0.003}O_{1.995}F_{0.005}$, and the press density of this powder was 3.24 g/cm$^3$. The press density under a pressure of 0.97 t/cm$^2$ was 3.51 g/cm$^3$. Further, 10 g of this powder was dispersed in 100 g of pure water, and after filtration the remaining alkali amount was obtained by potentiometric titration with 0.1N HCl, whereby it was 0.02 mass %.

In the same manner as in Example 1, a positive electrode body was produced, a cell was assembled, and the properties were measured. The initial volume capacity density of the positive electrode layer was 456 mAh/cm$^3$, the initial weight capacity density was 160 mAh/g, the capacity maintenance ratio after 30 times of cycle was 99.7%, and the heat generation starting temperature was 189° C.

EXAMPLE 6

A positive electrode active material was prepared in the same manner as in Example 2 except that in Example 2, zirconium oxide was used instead of titanium oxide. As a result of a chemical analysis, it was found to be $LiCo_{0.997}Zr_{0.003}O_{1.995}F_{0.005}$, the press density of this powder was 3.22 g/cm$^3$, and the press density under a pressure of 0.97 t/cm$^2$ was 3.47 g/cm$^3$.

Further, in the same manner as in Example 1, a positive electrode body was produced, a cell was assembled, and the properties were measured. The initial volume capacity density of the positive electrode layer was 457 mAh/cm$^3$, the initial weight capacity density was 161 mAh/g, the capacity maintenance ratio after 30 times of cycle was 99.5%, and the heat generation starting temperature was 172° C.

EXAMPLE 7

A mixed solution of an aqueous cobalt sulfate solution and ammonium hydroxide was continuously mixed with an aqueous sodium hydroxide solution, whereby a cobalt hydroxide slurry was continuously prepared by a known method, followed by steps of agglomeration, filtration and drying to obtain a cobalt hydroxide powder (the first cobalt hydroxide). In a powder X-ray diffraction using CuKα-ray, the half value width of a diffraction peak on (001) surface at 2θ=19±1° was 0.26°, and the half value width of a diffraction peak on (101) surface at 2θ=38±1° was 0.25°. As a result of observation by a scanning electron microscope, it was found to be formed of substantially spherical secondary particles having infinite fine particles agglomerated. As a result of a particle size distribution analysis by volume basis obtained from an image analysis of the observation by the scanning electron microscope, the average particle size D50 was 17.5 μm, D10 was 7.1 μm, and D90 was 26.4 μm.

When this secondary particles were dispersed in pure water, the secondary particles were easily disintegrated, and a slurry composed mainly of a primary particle, whereby it was found that this secondary particle has weak cohesion. Further, the particle size distribution of this secondary particle powder was measured by means of a laser scattering type particle size distribution measuring apparatus, using water as a dispersion medium. As a result, the average particle size D50 was 0.75 μm, D10 was 0.35 μm, and D90 was 1.6 μm. The slurry after completion of the measurement was dried, and observed by a scanning electron microscope, whereby the shape of the secondary particles before the measurement was not observed. The specific surface area of a cobalt hydroxide particle composed of the secondary particle was 17.1 m$^2$/g, the press density using an oil press device was 1.75 g/cm$^3$, and it was a substantially spherical cobalt hydroxide powder having primary particles weakly agglomerated.

On the other hand, by changing the conditions for producing cobalt hydroxide, i.e., the pH of the slurry, the maturing temperature, concentration of the slurry etc., a substantially spherical cobalt hydroxide (the second cobalt hydroxide) powder was prepared in the same manner. In the powder X-ray diffraction using CuKα-ray, the obtained cobalt hydroxide, showed a half value width of a diffraction peak on (001) surface at 2θ=19±1° being 0.28°, and a half value width of a diffraction peak on (101) surface at 2θ=38±1° being 0.21°. The particle size distribution of this secondary particle powder was measured by means of a laser scattering type particle size distribution measuring apparatus, using water as a dispersion medium. As a result, the average particle size D50 was 16.7 μm, D10 was 13.4 μm, and D90 was 21.1 μm. In the case of the aqueous dispersion, the shape of the secondary particle was not changed, and further, the specific surface area was 3.6 m$^2$/g, the tap density was 2.1 g/cm$^3$, and the press density was 2.11 g/cm$^3$, and it was found to be a substantially spherical cobalt hydroxide powder having needle-shaped primary particles firmly agglomerated. The ratio of the major axis to the minor axis (aspect ratio) of this second cobalt hydroxide particle was 1.3:1.

These two types of cobalt hydroxide and a lithium carbonate powder having a specific surface area of 1.2 m$^2$/g were mixed. The mixing ratio of the first cobalt hydroxide and the second cobalt hydroxide was 50:50 (weight ratio). A mixed ratio of these two types of cobalt hydroxide and cobalt carbonate was selected so as to form $LiCoO_2$ after firing, whereby the tap density of this blended powder was 1.29 g/cm$^3$. After completion of the dry mixing of these three types of powders, it was fired for 12 hours at 950° C. in air. The particle size distribution of a $LiCoO_2$ powder having primary particles agglomerated, obtained by crushing the fired product, was measured by means of the laser scattering type particle size distribution measuring apparatus, using water as a dispersion medium, whereby the average particle size D50 was 13.0 μm, D10 was 5.5 μm, D90 was 17.4 μm, and substantially spherical $LiCoO_2$ powder having a specific surface area of 0.53 m$^2$/g as determined by a BET method, was obtained.

With respect to the above $LiCoO_2$ powder, the X-ray diffraction spectrum was obtained by means of an X-ray diffraction device (RINT 2100 model manufactured by Rigaku Industrial Corporation). In the powder X-ray diffraction using CuKα-ray, the half value width of a diffraction peak on (110) surface at 2θ=66.5±1° was 0.097°. The press density of the $LiCoO_2$ powder was 3.21 g/cm$^3$. The press density under a pressure of 0.97 t/cm$^2$ was 3.48 g/cm$^3$. 10 g of the $LiCoO_2$ powder was dispersed in 100 g of pure water, and after filtration, the remaining alkali amount was obtained by potentiometric titration with 0.1N HCl, whereby it was 0.02 mass %.

By using the above $LiCoO_2$ powder, in the same manner as in Example 1, a positive body was produced, a cell was assembled, and the properties were measured. The initial volume capacity density was 460 mAh/cm$^3$ in the electrode layer, the initial weight capacity density was 163 mAh/g-$LiCoO_2$, and the capacity maintenance ratio after 30 times of the charge and discharge cycle was 97.9%. The heat generation starting temperature of the product charged with 4.3V was 163° C.

EXAMPLE 8

A $LiCoO_2$ powder was prepared in the same manner as in Example 1 except that in Example 7, the mixed ratio of the first cobalt hydroxide and the second cobalt hydroxide was 75:25 (weight ratio). The mixed ratio of cobalt hydroxide and cobalt carbonate was selected so as to form $LiCoO_2$ after firing, whereby the tap density of this blended powder was 1.12 g/cm$^3$. $LiCoO_2$ had an average particle size D50 of 13.5 μm, D10 of 5.9 μm, and D90 of 20.9 μm, and a $LiCoO_2$ powder having a specific surface area of 0.50 m$^2$/g as determined by a BET method, was obtained.

With respect to this $LiCoO_2$ powder, the X-ray diffraction spectrum was obtained by means of an X-ray diffraction device (RINT 2100 model manufactured by Rigaku Industrial Corporation). In the powder X-ray diffraction using CuKα-ray, the half value width of a diffraction peak on (110) surface at 2θ=66.5±1° was 0.110°. The press density of the obtained $LiCoO_2$ powder was 3.28 g/cm$^3$. Further, the press density under a pressure of 0.97 t/cm$^2$ was 3.54 g/cm$^3$. The remaining alkali amount was 0.02 mass %.

In the same manner as in Example 1, a positive electrode body was produced, a cell was assembled, and the properties were measured. The initial volume capacity density was 468 mAh/cm$^3$ in the electrode layer, the initial weight capacity density was 163 mAh/g-$LiCoO_2$, and the capacity maintenance ratio after 30 times of the charge and discharge cycle was 97.4%. Further, the heat generation starting temperature of the product charged with 4.3V was 164° C.

EXAMPLE 9

In Example 7, the second cobalt hydroxide was fired for 12 hours at a firing temperature of 900° C. in the atmosphere, whereby tricobalt tetroxide was prepared. In the powder X-ray diffraction using CuKα-ray, the prepared tricobalt tetroxide, showed a half value width of a diffraction peak of (220) surface at 2θ=31±1° being 0.122°, and a half value width of a diffraction peak on (311) surface at 2θ=37±1° being 0.127°. And then, it was measured by means of the laser scattering type particle size diffraction measuring apparatus, using water as a dispersion medium, whereby the average particle size D50 was 15.5 μm, D10 was 12.8 μm, D90 was 19.1 μm, and the specific surface area was 3.6 m$^2$/g. Further, the tap density was 2.2 g/cm$^3$, the press density was 2.30 g/cm$^3$, and it was a substantially spherical tricobalt tetroxide powder having needle-shaped primary particles firmly agglomerated. The ratio of the major axis and the minor axis of this tricobalt tetroxide powder was 1.3:1.

A $LiCoO_2$ powder was produced in the same manner as in Example 1 except that this tricobalt tetroxide powder and the first cobalt hydroxide in Example 1 were used. The mixed ratio of the tricobalt tetroxide and the first cobalt hydroxide was at a weight ratio of 1:1. The mixed ratio of the first cobalt hydroxide, the tricobalt tetroxide and lithium carbonate was selected so as to form $LiCoO_2$ after firing. As a result, the tap density of this blended powder was 1.37 g/cm$^3$. And then, it was measured by means of the laser scattering type particle size distribution measuring apparatus, using water as a dispersion medium, whereby $LiCoO_2$ showed an average particle size D50 being 13.2 μm, D10 being 6.0 μm, D90 being 21.3 μm, and the $LiCoO_2$ powder having a specific surface area of 0.51 m$^2$/g as determined by a BET method, was obtained. Further, the remaining alkali amount was 0.01 mass %.

With respect to the $LiCoO_2$ powder, the X-ray diffraction spectrum was obtained by means of the X-ray diffraction device (RINT 2100 model manufactured by Rigaku Industrial Corporation). In the powder X-ray diffraction using CuKα-ray, the half value width of a diffraction peak on (110) surface at 2θ=66.5±1° was 0.111°. The press density of the obtained $LiCoO_2$ powder was 3.23 g/cm$^3$. Further, the press density under a pressure of 0.97 t/cm$^2$ was 3.51 g/cm$^3$.

In the same manner as in Example 1, a positive electrode body was produced, a cell was assembled, and the properties were measured. The initial volume capacity density of the positive electrode layer was 463 mAh/cm$^3$ in the electrode layer, the initial weight capacity density was 162 mAh/g-$LiCoO_2$, and the capacity maintenance ratio after 30 times of charge and discharge cycle was 97.6%. Further, the heat generation starting temperature of the product charged with 4.3V was 163° C.

EXAMPLE 10

A positive electrode active material was prepared in the same manner as in Example 7 except that in Example 7, when two types of cobalt hydroxide and lithium carbonate were mixed, an aluminum hydroxide powder and a lithium fluoride powder were further added. The tap density of the blended powder of the starting material was 1.30 g/cm$^3$. As a result of an elemental analysis, it was found to be $LiCo_{0.997}Al_{0.003}O_{1.998}F_{0.002}$. The particle size distribution having primary particles agglomerated, obtained by crushing the fired product, was measured by means of a laser scattering type particle size distribution measuring apparatus. As a result, the average particle size D50 was 13.1 μm, D10 was 5.3 μm, D90 was 17.3 μm, and a substantially spherical $LiCoO_2$ powder having a specific surface area of 0.50 m$^2$/g determined by a BET method, was obtained.

With respect to the above power, the X-ray diffraction spectrum was obtained by means of an X-ray diffraction device (RINT 2100 model manufactured by Rigaku Industrial Corporation). In the powder X-ray diffraction using CuKα-ray, the half value width of a diffraction peak (110) surface at 2θ=66.5±1° was 0.100°. Further, the press density of the above powder was 3.23 g/cm$^3$. Further, the press density under a pressure of 0.97 t/cm$^2$ was 3.5 g/cm$^3$. As a result of research by means of a spectroscopic analysis, aluminum and fluorine were found to be localized on the surface. This remaining alkali amount was 0.02 mass %.

By using the above $LiCo_{0.997}Al_{0.003}O_{1.998}F_{0.002}$ powder, in the same manner as in Example 1, a positive electrode body was produced, a cell was assembled, and the properties were measured. The initial volume capacity density was 464 mAh/cm$^3$ in the electrode layer, the initial weight capacity density was 161 mAh/g-$LiCoO_2$, a capacity maintenance ratio after 30 times of charge and discharge cycle was 99.4%. The heat generation starting temperature of the product charged with 4.3 V was 179° C.

EXAMPLE 11

Comparative Example $LiCoO_2$ was prepared in the same manner as in Example 7 except that in Example 7, only the second cobalt hydroxide was used as a cobalt source without using the first cobalt hydroxide. The mixed ratio of the cobalt hydroxide and the cobalt carbonate was selected so as to form $LiCoO_2$ after firing. The tap density of this blended powder was 2.01 g/cm$^3$. The press density of the obtained $LiCoO_2$ powder was 2.95 g/cm$^3$. Further, the press density under a pressure of 0.97 t/cm$^2$ was 3.19 g/cm$^3$.

In the same manner as in Example 1, a positive electrode body was produced, a cell was assembled, and the properties were measured. The initial volume capacity density was 441 mAh/cm$^3$ in the electrode layer, the initial weight capacity density was 160 mAh/g-$LiCoO_2$, and the capacity maintenance ratio after 30 times of charge and discharge cycle was 97.0%. Further, the heat generation starting temperature of the product charged with 4.3 V was 164° C.

EXAMPLE 12

Comparative Example

LiCoO$_2$ was prepared in the same manner as in Example 7 except that in Example 9, only the second tricobalt tetroxide was used as a cobalt source without using the first cobalt hydroxide. The mixed ratio of the tricobalt tetroxide and the cobalt carbonate was selected so as to form LiCoO$_2$ after firing. As a result, the tap density of this blended powder was 2.15 g/cm$^3$. The press density of the obtained LiCoO$_2$ powder was 2.93 g/cm$^3$. Further, the press density under a pressure of 0.97 t/cm$^2$ was 3.17 g/cm$^3$.

In the same manner as in Example 1, a positive electrode body was produced, a cell was assembled, and the properties were measured. The initial volume capacity density was 440 mAh/cm$^3$ in the electrode layer, the initial weight capacity density was 161 mAh/g-LiCoO$_2$, and the capacity maintenance ratio after 30 times of the charge and discharge cycle was 97.1%. Further, the heat generation starting temperature of the product charged with 4.3V was 160° C.

EXAMPLE 13

A positive electrode active material as prepared in the same manner as in Example 10 except that in Example 10, titanium oxide was used instead of aluminum hydroxide. As a result of a chemical analysis, it was found to be LiCo$_{0.997}$Ti$_{0.003}$O$_{1.998}$F$_{0.002}$, and the press density of this powder was 3.22 g/cm$^3$. Further, the press density under a pressure of 0.97 t/cm$^2$ was 3.47 g/cm$^3$ Titan and fluorine were present on the surface. The remaining alkali amount was 0.02 mass %.

In the same manner as in Example 1, a positive electrode body was produced, a cell was assembled, and the properties were measured. The initial volume capacity density was 460 mAh/cm$^3$ in the electrode layer, the initial weight capacity density was 160 mAh/g, the capacity maintenance ratio after 30 times of the cycle was 99.4%, and the heating generation starting temperature was 178° C.

EXAMPLE 14

A positive electrode active material was prepared in the same manner as in Example 11 except that in Example 10, magnesium hydroxide was used instead of aluminum hydroxide. As a result of a chemical analysis, it was found to be LiCo$_{0.997}$Mg$_{0.003}$O$_{1.998}$F$_{0.002}$, and the press density of this powder was 3.25 g/cm$^3$. Further, the press density under a pressure of 0.97 t/cm$^2$ was 3.52 g/cm$^3$. Magnesium and fluorine were present on the surface. The remaining alkali amount was 0.02 mass %.

A positive electrode body was produced, a cell was assembled, and the properties were measured in the same manner as in Example 1. The initial volume capacity density was 465 mAh/cm$^3$ in the electrode layer, the initial weight capacity density was 160 mAh/g, the capacity maintenance ratio after 30 times of the cycle was 99.7%, and the heat generation starting temperature was 189° C.

EXAMPLE 15

A positive electrode active material was prepared in the same manner as in Example 11 except that in Example 10, zirconium oxide was used instead of aluminum hydroxide. As a result of a chemical analysis, it was found to be LiCo$_{0.997}$Zr$_{0.003}$O$_{1.998}$F$_{0.002}$, the press density of this powder was 3.21 g/cm$^3$. Further, the press density under a pressure of 0.97 t/cm$^2$ was 3.49 g/cm$^3$. Zirconium and fluorine were present on the surface. The remaining alkali amount was 0.02 mass %.

In the same manner as in Example 1, a positive electrode body was produced, a cell was assembled, and the properties were measured. The initial volume capacity density was 458 mAh/cm$^3$ in the electrode layer, the initial weight capacity density was 160 mAh/g, the capacity maintenance ratio after 30 times of a cycle was 99.4%, and the heat generation starting temperature was 172° C.

EXAMPLE 16

By continuously mixing a mixture of an aqueous cobalt sulfate solution and an ammonium hydroxide with an aqueous sodium hydroxide solution, whereby a cobalt hydroxide slurry was continuously prepared by a known method, followed by steps of agglomeration, filtration and drying to obtain a cobalt hydroxide powder. In the powder X-ray diffraction using CuKα-ray, the obtained cobalt hydroxide, showed a half value width of a diffraction peak on (001) surface at 2θ=19±1° being 0.27°, and a half value width of a diffraction peak on (101) surface at 2θ=38±1° being 0.23°. As a result of observation by a scanning electron microscope, it was found to be formed of substantially spherical secondary articles having infinite form fine particles agglomerated. As a result of a particle size distribution analysis by volume basis obtained from an image analysis of the observation by the scanning electron microscope, the average particle size D50 was 17.5 μm, D10 was 7.1 μm, and D90 was 26.4 μm.

When these secondary particles were dispersed in pure water, the secondary particles were easily disintegrated, and a slurry composed mainly of primary particles was formed, whereby it was found that the cohesion force of these secondary particles were weak. Further, the particle size distribution of this secondary particle powder was measured after irradiation with an ultrasonic wave (42 KHz, 40W) for 3 minutes by means of a laser scattering type particle size distribution measuring apparatus, using water as a dispersion medium. As a result, the average particle size D50 was 0.75 μm, D10 was 0.35 μm, and D90 was 1.6 μm. The slurry after completion of the measurement was dried and observed by a scanning electron microscope, whereby the shape of the secondary particles before the measurement was not observed. The specific surface area of the cobalt hydroxide particles being secondary particles was 17.1 m$^2$/g, the press density under a pressure of 0.3 t/cm$^2$ was 1.75 g/cm$^3$, and it was a substantially spherical cobalt hydroxide powder having primary particles weakly agglomerated.

Cobalt oxyhydroxide to be used was measured in the same manner by means of a laser scattering type particle size distribution measuring apparatus, using water as a dispersion medium. As a result the average particle size D50 was 11.7 μm, D10 was 4.9 μm D90 was 16.5 μm, and the specific surface area determined by a BET method was 45 m$^2$/g. The cobalt oxyhydroxide was observed by the scanning electron microscope, whereby it was found that the primary particles were agglomerated to form the secondary particles. This cobalt oxyhydroxide showed a half value width of a diffraction peak on (220) surface at 2θ=31±1° being 1.32°, and a half value width of a diffraction peak on (311) surface at 2θ=37±1° being 1.35°.

The mixed ratio of this cobalt oxyhydroxide, the cobalt hydroxide and the lithium carbonate was selected so as to form LiCoO$_2$ after firing. Here, the blended ratio of the cobalt oxyhydroxide and the cobalt hydroxide was 1:1 in a cobalt atomic ratio. These three types of powders were obtained by dry blending. The tap density of the prepared portion was 1.19 g/cm$^3$. This prepared powder was fired for 12 hours at 950° C. in air. The particle size distribution of a LiCoO$_2$ powder having primary particles agglomerated, obtained by crushing the fired product, was measured by means of the laser diffusion type particle size distribution measuring apparatus, using water as a dispersion medium. As a result, the average particle size D50 was 11.1 μm, D10 was 4.7 μm, D90 was 18.5 μm, and a LiCoO$_2$ powder having a specific surface area of 0.34 m$^2$/g as determined by a BET method. In the present invention, the tap density was obtained in accordance with JISR9301-2-3.

10 g of this LiCoO$_2$ powder was dispersed in 100 g of pure water, and after filtration, the remaining alkali amount was obtained by potentiometric titration with 0.1 N HCl and found to be 0.02 mass %. Further, with respect to a LiCoO$_2$ powder, the X-ray diffraction spectrum was obtained by means of the X-ray diffraction device (RINT 2100 model manufactured by Rigaku Industrial Corporation). In the powder X-ray diffraction using CuKα-ray, the half value width of a diffraction peak on (110) surface at 2θ=66.5±1° was 0.097°. The press density of the powder was 3.20 g/cm$^3$. Further, the press density under a pressure of 0.97 t/cm$^2$ was 3.47 g/cm$^3$.

In the same manner as in Example 1 of the above powder, a positive electrode body was produced, a cell was assembled, and the properties were measured. The initial volume capacity density was 465 mAh/cm$^3$ in the electrode layer, the initial weight capacity density was 163 mAh/g-LiCoO$_2$, and the capacity maintenance ratio after 30 times of the charge and discharge cycle was 97.2%. The heat generation starting temperature of the product charged with 4.3V was 166° C.

EXAMPLE 17

A LiCoO$_2$ powder was prepared in the same manner as in Example 16 except that in Example 16, the mixed ratio of the cobalt oxyhydroxide and cobalt hydroxide was 70:30 (cobalt atomic ratio). The mixed ratio of the cobalt oxyhydroxide, cobalt hydroxide and lithium carbonate was selected so as to form LiCoO$_2$ after firing. The tap density of prepared powder was 1.43 g/cm$^3$. As the obtained LiCoO$_2$, the average particle size D50 was 11.3 μm, D10 was 4.0 μm, D90 was 18.4 μm, and a LiCoO$_2$ powder having a specific surface area of 0.36 m$^2$/g as determined by a BET method, was obtained.

With respect to the LiCoO$_2$ powder, the X-ray diffraction spectrum was obtained by means of the X-ray diffraction device (RINT 2100 model manufactured by Rigaku Industrial Corporation). In the powder X-ray diffraction using CuKα-ray, the half value width of a diffraction peak on (110) surface at 2θ=66.5±1° was 0.099°. The press density of the obtained LiCoO$_2$ powder was 3.17 g/cm$^3$. Further, the press density under a pressure of 0.97 t/cm$^2$ was 3.42 g/cm$^3$. The alkali amount of the LiCoO$_2$ was 0.02 mass %.

In the same manner as in Example 1, a positive electrode body was produced, a cell was assembled, and the properties were measured. The initial volume capacity density was 456 mAh/cm$^3$ in the electrode layer, the initial weight capacity density was 161 mAh/g-LiCoO$_2$, and the capacity maintenance ratio after 30 times of the charge and discharge cycle was 97.1%. Further, the heat generation starting temperature of the product charged with 4.3V was 165° C.

EXAMPLE 18

A positive electrode active material was prepared in the same manner as in Example 16 except that in Example 16, when cobalt oxyhydroxide, cobalt hydroxide and lithium carbonate were mixed, the titanium oxide powder and a lithium fluoride powder were added further. The tap density of the prepared powder was 1.20 g/cm$^3$. As a result of an elemental analysis, it was found to be LiCo$_{0.997}$Ti$_{0.003}$O$_{1.998}$F$_{0.002}$. The particle size distribution of a powder having primary particles agglomerated, obtained by crushing the fired product, was measured by means of a laser scattering type particle size distribution measuring apparatus. As a result, the average particle size D50 was 10.5 μm, D10 was 3.9 μm, D90 was 17.8 μm, and a substantially spherical powder having a specific surface area of 0.43 m$^2$/g as determined by a BET method, was obtained. The alkali amount of this powder was 0.02 mass %.

With respect to this powder, the X-ray diffraction spectrum was obtained by means of the X-ray diffraction device (RINT 2100 model manufactured by Rigaku Industrial Corporation). In the powder X-ray diffraction using CuKα-ray, the half value width of a diffraction peak on (110) surface at 2θ=66.5±1° was 0.118°. The press density of the above powder was 3.20 g/cm$^3$. Further, the press density under a pressure of 0.97 t/cm$^2$ was 3.46 g/cm$^3$. As a result of a research by means of an XPS spectroscopic analysis, titanium and fluorine were localized on the surface.

In the same manner as in Example 1 of the above powder, a positive electrode body was produced, a cell was assembled, and the properties were measured. The initial volume capacity density was 456 mAh/cm$^3$ in the electrode layer, the initial weight capacity density was 162 mAh/g, and the capacity maintenance ratio after 30 times of the charge and discharge cycle was 99.4%. Further, the heat generation starting temperature of the product charged with 4.3V was 175° C.

EXAMPLE 19

A positive electrode active material was produced in the same manner as in Example 18 except that in Example 18, aluminum hydroxide was used instead of titanium oxide. As a result of a chemical analysis, it was found to be LiCo$_{0.997}$Al$_{0.003}$O$_{1.998}$F$_{0.002}$, and the press density of this powder was 3.19 g/cm$^3$. Further, the press density under a pressure of 0.97 t/cm$^2$ was 3.45 g/cm$^3$. Aluminum and fluorine were present on the surface. The remaining alkali amount was found to be 0.02 mass %.

In the same manner as in Example 1, a positive electrode was produced, a cell was assembled, and the properties were measured. The initial volume capacity density was 456 mAh/cm$^3$ in the electrode layer, the initial weight capacity density was 160 mAh/g, the capacity maintenance ratio of 30 times of the cycle was 99.4%, and the heat generation starting temperature was 178° C.

EXAMPLE 20

In Example 18, a positive electrode material was prepared in the same manner as in Example 18 except that magnesium hydroxide was used instead of titanium oxide. As a result of a chemical analysis, it was found to be LiCo$_{0.997}$Mg$_{0.003}$O$_{1.998}$F$_{0.002}$, and the press density of this powder was 3.19 g/cm$^3$. Further, the press density under a pressure of 0.97 t/cm$^2$ was 3.46 g/cm$^3$. Further, magnesium and fluorine were present on the surface. The remaining alkali amount was 0.02 mass %.

In the same manner as in Example 1, a positive electrode body was produced, a cell was assembled, and the properties are measured. The initial volume capacity density was 461 mAh/cm$^3$ in the electrode layer, the initial weight capacity density was 161 mAh/g, the capacity maintenance ratio after 30 times of the cycle was 99.6%, and the heat generation starting temperature was 186° C.

EXAMPLE 21

A positive electrode active material was prepared in the same manner as in Example 18 except that in Example 18, zirconium oxide was used instead of titanium oxide. As a result of a chemical analysis, it was found to be LiCo$_{0.997}$Zr$_{0.003}$O$_{1.995}$F$_{0.005}$, and the press density of this powder was 3.19 g/cm$^3$. Further, the press density under a pressure of 0.97 t/cm$^2$ was 3.45 g/cm$^3$. Zirconium and fluorine were present on the surface. The remaining alkali amount was 0.02 mass %.

In the same manner as in Example 1, a positive electrode body was produced, a cell was assembled, and the properties were measured. The initial volume capacity density was 461 mAh/cm$^3$ in the electrode layer, the initial weight capacity density was 161 mAh/g, the capacity maintenance ratio after 30 times of the cycle was 99.4%, and the heat generation starting temperature was 173° C.

INDUSTRIAL APPLICABILITY

According to the present invention, a process for producing a lithium-cobalt composite oxide for a positive electrode for a lithium secondary cell, which has a large volume capacity density and high safety, and is excellent in charge and discharge cyclic durability, and a positive electrode for the lithium secondary cell containing the produced lithium-cobalt composite oxide, and a lithium secondary cell, are provided.

The entire disclosures of Japanese Patent Application No. 2002-258124 filed on Sep. 3, 2002, Japanese Patent Application No. 2002-281858 filed on Sep. 26, 2002 and Japanese Patent Application No. 2002-281870 filed on Sep. 26, 2002 including specifications, claims and summaries are incorporated herein by reference in their entireties.

What is claimed is:

1. A process for producing a lithium-cobalt composite oxide for a positive electrode for a lithium secondary cell, the lithium-cobalt composite oxide being represented by the formula Li$_p$CO$_x$M$_y$O$_z$F$_a$ (wherein M is a transition metal element other than Co, aluminum or an alkaline earth metal element, $0.9 \leq p \leq 1.1$, $0.980 \leq x \leq 1.000$, $0 \leq y \leq 0.02$, $1.9 \leq z \leq 2.1$, x+y=1 and $0 \leq a=0.02$), which comprises firing a mixture of a cobalt source, a lithium source, and, if required, the above M element source and a fluorine source, at a temperature of from 800° C. to 1050° C. in an oxygen containing atmosphere, characterized in that the cobalt source comprises a first cobalt hydroxide and a cobalt oxyhydroxide, where the first cobalt hydroxide has a specific surface area of from 5 to 50 m$^2$/g, a press density of from 1.0 to 2.5 g/cm$^3$ and a structure having secondary particles formed by agglomeration of primary particles, and further that the average particle size D50 after the secondary particles are dispersed in pure water is at most ¼ of the original average particle size, wherein, as measured by means of X-ray diffraction in which CuKα is used as a radiation source, of the first cobalt hydroxide, the half value width of a diffraction peak on (001) surface at 2θ=19±1° is from 0.18 to 0.35°, and the half value width of a diffraction peak on (101) surface at 2θ=38±1° is from 0.15 to 0.35°, and of the cobalt oxyhydroxide, the half value width of the diffraction peak on the (220) surface at 2θ=31±1° is at least 0.8°, and the half value width of the diffraction peak on the (311) surface at 2θ=37±1° is at least 0.8°, and the specific surface area is from 10 to 80 m$^2$/g.

2. The process according to claim 1, wherein the cobalt oxyhydroxide comprises secondary particles, which are formed by agglomeration of primary particles and which have a substantially spherical shape with an average particle size of from 7 to 20 µm.

3. The process according to claim 1, wherein the average particle size D50 of the secondary particles of the first cobalt hydroxide is from 5 to 25 µm.

4. The process according to claim 1, wherein the average particle size D50 of the primary particles of the first cobalt hydroxide is from 0.1 to 1.2 µm.

5. The process according to claim 2, wherein the cobalt oxyhydroxide has a specific surface area of at least 2 m$^2$/g, and a tap density of from 1.7 to 2.4 g/cm$^3$.

6. The process according to claim 2, wherein the cobalt oxyhydroxide has D10 which is at least 50% of D50, and D90 which is at most 150% of D50.

7. The process according to claim 1, wherein the lithium-cobalt composite oxide has a press density of from 3.15 to 3.40 g/cm$^3$.

8. The process according of claim 1, wherein M is at least one member selected from the group consisting from Ti, Zr, Hf, V, Nb, Ta, Mn, Mg, Ca, Sr, Ba and Al.

9. The process according to claim 1, wherein of the lithium-cobalt composite oxide, the half value of width of the diffraction peak on the (110) surface is from 0.07 to 0.14°, the specific surface area is from 0.3 to 0.7 m$^2$/g, and the heat generation starting temperature is at least 160° C.

10. The process according to claim 1, wherein the remaining alkali amount contained in the lithium-cobalt composite oxide is at most 0.03 mass %.

11. A positive electrode for a lithium secondary cell, which contains a lithium-cobalt composite oxide produced by the process as defined in claim 1.

12. A lithium secondary cell, wherein the positive electrode as defined in claim 11 is used.

13. A process for producing a lithium-cobalt composite oxide for a positive electrode for a lithium secondary cell, the lithium-cobalt composite oxide being represented by the formula Li$_p$CO$_x$M$_y$O$_z$F$_a$(wherein M is a transition metal element other than Co, aluminum or an alkaline earth metal element, $0.9 \leq p \leq 1.1$, $0.980 \leq x \leq 1.000$, $0 \leq y0.02$, $1.9 \leq z \leq 2.1$, x+y=1 and $0.001 \leq a \leq 0.02$), which comprises firing a mixture of a cobalt source, a lithium source, and, if required, the above M element source and a fluorine source, at a temperature of from 800° C. to 1050° C. in an oxygen containing atmosphere, characterized in that as the above cobalt source, cobalt hydroxide is used which has a specific surface area of from 5 to 50 m$^2$/g, a press density of from 1.0 to 2.5 g/cm$^3$ and a structure having secondary particles formed by agglomeration of primary particles, and further that the average particle size D50 after the secondary particles are dispersed in pure water, is at most ¼ of the original average particle size.

* * * * *